United States Patent
Volmer et al.

(10) Patent No.: US 12,057,720 B2
(45) Date of Patent: Aug. 6, 2024

(54) BLOWER FILTER DEVICE FOR POTENTIALLY EXPLOSIVE AREAS AND PROCESS FOR OPERATING A BLOWER FILTER DEVICE

(71) Applicant: Dräger Safety AG & Co. KGaA, Lübeck (DE)

(72) Inventors: Achim Volmer, Krummesse (DE); Martin Schulze, Bad Kleinen (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 968 days.

(21) Appl. No.: 17/046,215

(22) PCT Filed: Apr. 9, 2019

(86) PCT No.: PCT/EP2019/058947
§ 371 (c)(1),
(2) Date: Oct. 8, 2020

(87) PCT Pub. No.: WO2019/197400
PCT Pub. Date: Oct. 17, 2019

(65) Prior Publication Data
US 2021/0033100 A1 Feb. 4, 2021

(30) Foreign Application Priority Data
Apr. 11, 2018 (DE) .................. 10 2018 002 952.3

(51) Int. Cl.
*H02J 7/00* (2006.01)
*A62B 7/10* (2006.01)
(Continued)

(52) U.S. Cl.
CPC ............ *H02J 7/00304* (2020.01); *A62B 7/10* (2013.01); *A62B 18/006* (2013.01);
(Continued)

(58) Field of Classification Search
CPC .......... H02J 7/00304; A62B 7/10; A62B 7/02; A62B 18/006; A62B 18/02; A62B 18/04;
(Continued)

(56) References Cited

U.S. PATENT DOCUMENTS

| 7,699,053 | B1* | 4/2010 | Johnson ............... | A62B 18/006 128/204.26 |
|---|---|---|---|---|
| 2006/0152194 | A1 | 7/2006 | Wang | |
| 2007/0079701 | A1* | 4/2007 | Sayers ................. | A62B 18/006 95/1 |
| 2007/0119452 | A1* | 5/2007 | Schubert .................. | A62B 7/10 128/205.27 |
| 2012/0051904 | A1 | 3/2012 | Hagen et al. | |
| 2013/0106355 | A1 | 5/2013 | Kim | |

(Continued)

FOREIGN PATENT DOCUMENTS

| CN | 2802813 Y | 8/2006 |
|---|---|---|
| CN | 203660561 U | 6/2014 |

(Continued)

*Primary Examiner* — Joseph D. Boecker
*Assistant Examiner* — Brian T Khong
(74) *Attorney, Agent, or Firm* — McGlew and Tuttle, P.C.

(57) ABSTRACT

A blower filter device (3) is connectable to a voltage supply unit (2) and includes a blower unit (5), a filter mount (14), an internal energy storage unit (7), an energy interface (9), a current limitation device (13), a sensor array (16, 17, 18) and a control device (6). The current limitation device is activated upon disconnecting the energy interface from the voltage supply unit. The activated current limitation device limits the intensity of a current from the energy interface to the internal energy storage device. Upon the voltage supply unit being connected to the energy storage device and a predefined deactivating event is detected, the control device deactivates the current limitation device. The deactivating event is based on a charging voltage of the internal energy storage unit and/or on a time period that has elapsed since the connection. A process is provided for operating such a blower filter device.

19 Claims, 5 Drawing Sheets

(51) Int. Cl.
  *A62B 18/00* (2006.01)
  *F04D 25/06* (2006.01)
  *F04D 27/00* (2006.01)
  *H02H 9/00* (2006.01)
  *H02H 9/06* (2006.01)

(52) U.S. Cl.
  CPC ....... *F04D 25/0673* (2013.01); *F04D 27/008* (2013.01); *H02H 9/008* (2013.01); *H02H 9/06* (2013.01); *F04D 27/001* (2013.01)

(58) Field of Classification Search
  CPC .............. F04D 25/0673; F04D 27/008; F04D 27/001; H02H 9/008; H02H 9/02; H02H 9/06; H02H 9/025; A61M 16/0066; A61M 16/0069
  See application file for complete search history.

(56) References Cited

U.S. PATENT DOCUMENTS

| | | | |
|---|---|---|---|
| 2015/0211534 A1* | 7/2015 | Volmer | ................ A62B 18/006 417/45 |
| 2016/0226107 A1 | 8/2016 | Worry | |
| 2016/0372944 A1* | 12/2016 | Volmer | ................ H02J 7/00309 |

FOREIGN PATENT DOCUMENTS

| | | |
|---|---|---|
| CN | 105340149 A | 2/2016 |
| CN | 105896564 A | 8/2016 |
| DE | 2808963 A1 | 9/1979 |
| DE | 19807907 A1 | 9/1999 |
| DE | 102012013656 A1 | 5/2014 |
| DE | 102013011251 A1 | 1/2015 |
| DE | 102016215688 A1 | 2/2018 |
| WO | 2014008998 A2 | 1/2014 |

* cited by examiner

BLOWER FILTER DEVICE FOR POTENTIALLY EXPLOSIVE AREAS AND PROCESS FOR OPERATING A BLOWER FILTER DEVICE

CROSS REFERENCE TO RELATED APPLICATIONS

This application is a United States National Phase Application of International Application PCT/EP2019/058947, filed Apr. 9, 2019, and claims the benefit of priority under 35 U.S.C. § 119 of German Application 10 2018 002 952.3, filed Apr. 11, 2018, the entire contents of which are incorporated herein by reference.

TECHNICAL FIELD

The present invention pertains to a blower filter device, which can be connected to a voltage supply unit, to a blower filter system with such a blower filter device and with a voltage supply unit as well as to a process for operating such a blower filter device.

TECHNICAL BACKGROUND

Passive respirator devices with respirator filters, which a user can wear in front of his face and which offer the user protection from gases, particles or the like that are hazardous to health or toxic, are known. Based on their configuration, passive respirator devices have basically the drawback that the air intake pressure is increased because of an inner resistance of the respirator filter.

In order to avoid this drawback, blower filter devices are used, which lower the breathing resistance and thus make possible or at least improve a prolonged, fatigue-free use.

A usual blower filter device is typically worn on the belt of the user and is also called "powered air purifying respirator" or "PAPR." Furthermore, it comprises a headpiece, which may be configured, for example, as a hood, a mask, a mouthpiece or the like. The blower filter device and the headpiece are usually connected to one another via a tube of the blower filter device in a fluid-communicating manner. Possibly contaminated air is drawn in by means of the blower filter device through a filter device, by means of which harmful substances can be filtered out of the contaminated air, and are then passed on via the tube to the headpiece to the user. The user of the blower filter device is thus supplied with clean breathing air.

A usual blower filter device comprises, as a rule, a blower unit with a fan impeller driven by a motor and with a spiral housing. The electrical energy necessary for operating the blower unit is usually supplied by a battery arranged in a corresponding storage unit of the blower filter device in the form of a battery pack. Inputs of the user can be processed by means of a central control device, and the motor of the blower unit can be actuated. A housing encloses, in general, the blower unit, the control device and the battery. At least one filter can be connected to the housing.

US 2012/0051904 A1 describes a compact, screw-like blower unit, which belongs to a respirator (powered air purifying respirator).

It is often required that a respirator device with a blower filter device be able to be used in a potentially explosive area, for example, in an area in which explosive gases or dusts are present. Such an environment imposes special requirements on the devices used there. Two causes of a potential ignition must be ruled out in explosion protection: Spark ignition, usually avoided by limiting the energy being released in case of a defect, and spontaneous ignition, usually avoided by a limitation of the temperature.

The battery pack is often integrated directly in the blower filter device or is coupled with the blower filter device by means of a special closure such that a change of the battery pack requires a tool configured for this purpose. The reason for this is that blower filter devices requires high currents and hence high powers for an uninterruptible function. The power consumption may require, for example, outputs around 20 W depending on the outfit of the devices.

This high power consumption inevitably requires for the concrete circuit configuration of such a unit that the blower, which represents the principal function of the unit, has to be operated with a high voltage.

A considerable compensating current frequently develops in practice in a blower filter device with a battery back that can be disconnected in a simple manner because of this arrangement when the battery pack is inserted or when an equivalent external energy supply unit is activated. This current may possibly reach a double-digit Ampere range.

DE 102012013656 A1 describes a blower filter system, which is suitable for use in potentially explosive environments. A battery pack comprising a plurality of cells can be electrically and detachably connected to a blower unit. Protective circuits in the battery pack prevent excessively high currents and/or excessively high temperatures from developing. These protective circuits switch off some of the cells of the battery pack when needed.

DE 19807907 A1 describes a process and a circuit for avoiding a short-circuit when an electrical device, e.g., a mobile telephone, is connected to a current supply unit. After the connection, the voltage of the current supply unit is applied to the device at first via a protective resistor. The protective resistor is bridged over only when the device-side voltage has reached a predefined value.

SUMMARY

A basic object of the present invention is to provide a blower filter device having the features of the device of the invention and a process having the features of the of the process of the invention, which make possible the use of the blower filter device in potentially explosive environments in a different manner than do prior-art devices and processes.

The blower filter device according to the present invention comprises
 a blower unit,
 a filter mount,
 an internal energy storage unit,
 an energy interface,
 a current limitation device,
 a sensor array and
 a control device.

The internal energy storage unit is connected to the blower unit. The internal energy storage unit is likewise connected electrically to the energy interface.

The blower unit is capable of generating an air current. The filter mount is capable of accommodating a filter unit. The blower filter device is configured such that an air stream generated by the blower unit flows through a filter unit accommodated by the filter mount and is filtered in the process.

The energy interface can be connected electrically detachably to a voltage supply unit. This voltage supply unit is not necessarily an integral part of the blower filter device. The energy interface can again be disconnected electrically from this voltage supply unit.

The internal energy storage unit can be charged with electrical energy. The internal energy storage unit is capable of releasing stored electrical energy again.

The current limitation device can be optionally activated or deactivated. The current limitation device is activated at least when the energy interface is disconnected from the voltage supply unit.

The activated current limitation device is capable of maintaining the intensity of a current, which flows from the energy interface to the internal energy storage unit, below a predefined current intensity limit. The control device is capable of automatically activating and deactivating the current limitation device. With the current limitation device deactivated, the intensity of a current from the energy interface to the internal energy storage unit is not limited any more to the predefined current intensity limit.

The control device processes signals from the sensor array and deactivates the current limitation device when a predefined deactivating event was detected. This deactivating event is one of the following events:

The state of charge of the internal energy storage unit has exceeded a predefined state of charge limit.

A predefined time limit has elapsed since the establishment of an electrical connection between the energy interface and the voltage supply unit.

The process according to the present invention comprises the following process steps.

The blower filter device is capable of drawing in ambient air and of filtering it via a filter unit in the filter mount and of sending the filtered air to a user of the blower filter device. The blower unit is capable of drawing in ambient air and of passing on the filtered air.

According to the present invention, the blower filter device comprises a chargeable internal energy storage unit. Thanks to this internal energy storage unit, it is not necessary to connect the blower filter device permanently to a stationary voltage supply unit. This is not possible at all in many applications. If the energy interface is not connected at times to a mobile voltage supply unit, for example, to a battery pack, the internal energy storage unit ensures for a certain time period that the blower unit is nevertheless supplied with the needed current, independently from the state of charge of the mobile voltage supply unit. As a result, the internal energy storage unit contributes to guaranteeing a stable operation of the blower unit.

The blower filter device can be detachably connected to a voltage supply unit. Therefore, a permanent connection is not necessary. The voltage supply unit can be replaced. This increases the area of application of the blower filter device.

Thanks to the energy interface, the blower filter device can be detachably connected to a voltage supply unit. It is possible, but not necessary thanks to the energy interface and the internal energy storage unit, that the voltage supply unit is a fixed or integral part of the blower filter device. It is rather possible during the use to connect the energy interface from time to time to a stationary or mobile voltage supply unit and to disconnect it again from this. If a mobile voltage supply unit is used, it can be replaced when it is discharged. Thanks to the internal energy storage unit, the blower filter device can nevertheless continue to be used for a certain time.

According to the present invention, the current limitation device is activated at least when the energy interface is disconnected from the voltage supply unit. If only the energy interface is connected electrically to the voltage supply unit, the current limitation device is therefore activated at first and does not need first to be activated as a response to the connection, which may take time. It maintains the intensity of a current from the energy interface to the internal energy storage unit below a predefined current intensity limit. The current intensity from the voltage supply unit to the internal energy storage unit is thus also maintained below the predefined current intensity limit.

Since this current intensity limit is not exceeded, the risk that there actually is an explosion hazard is ruled out or at least significantly reduced in a potentially explosive environment. In particular, the risk that an arc would develop is ruled out or at least reduced. Furthermore, the risk that electrical contacts would burn off or be damaged in another manner due to a high current intensity at the beginning of the charging or due to an arc is reduced. The dimensions of the contacts can therefore be reduced compared to the case in which the current intensity is not limited. In particular, it is not necessary to dimension the electrical contacts to be larger than is necessary for the continuous operation in order to guarantee a fatigue endurance limit. As a result, the manufacturing costs can be reduced and space is saved.

Thanks to the current limitation, the energy interface can be connected to the voltage supply unit in the potentially explosive environment. It is not necessary for a user to leave the potentially explosive environment from time to time in order to, e.g., replace the voltage supply unit or in order to charge the internal energy storage unit and then to return again into the potentially explosive environment. The present invention thus increases the effective attainable duration of use of the blower filter device.

The current from the voltage supply unit charges the internal energy storage unit of the blower filter device. As a result, the state of charge of the internal energy storage unit increases. The sensor detects according to the present invention the predefined deactivating event. When this event has occurred, the internal energy storage unit is charged sufficiently more strongly than at the beginning of the charging. The risk of an explosion will not therefore be present any longer. The current does not need to be reduced any more by the current limitation device to the current intensity limit, but it remains below the current intensity even without a limitation by a device thanks to the higher state of charge. Since a current of a higher current intensity can then flow, the internal energy storage unit is charged more rapidly. This saves time compared to a continuous current limitation. The blower filter device is fully ready for use in a shorter time.

In one alternative, the deactivating event will have occurred when the state of charge has exceeded the state of charge limit. To determine this, it is sufficient to measure locally a variable, which is correlated with the state of charge. It is possible, but not necessary thanks to the present invention to measure a voltage at the energy interface or a current intensity.

In another alternative, the deactivating event will have occurred when a predefined time period has elapsed since the connection. This alternative makes do with especially simple sensors: With a sensor that detects the establishment of the connection, and a clock.

The effect achieved according to the present invention, namely that the current intensity is limited only until the deactivating event is detected, additionally has in many cases the following advantage over a continuous current limitation: The current limitation causes in many cases electrical power to be consumed for the component or for a component that brings about the current intensity limitation.

This power is no longer available as useful power. Since the current limitation is carried out only until the deactivating event is detected, the power loss occurs for a limited and, as a rule, very short time period only. The present invention consequently prolongs the duration of use of the blower filter device. In addition, the power loss leads to an increase in temperature, which is often undesirable. It is useful for this reason as well to carry out the current limitation over a certain time only, namely, for as long as necessary.

The limitation according to the present invention of the current intensity does not impose any special requirements on the voltage supply unit. The limitation is rather carried out independently from the voltage supply unit within the blower filter device. According to the present invention, the current intensity is limited from the energy interface to the internal energy storage unit when the current limitation device is activated. The present invention thus eliminates the need to have to provide a special voltage supply unit, which is suitable for use in a potentially explosive environment. In particular, it is not necessary to have to actuate the voltage supply unit from the outside or to have to switch off individual cells of the voltage supply unit or to ensure that the voltage supply unit only supplies current with a limited current intensity at times. The blower filter device according to the present invention thus imposes less stringent requirements on the voltage supply unit than do prior-art blower filter devices, which are likewise suitable for potentially explosive environments.

The current intensity limit can consequently be set such that it is guaranteed at a current intensity below the current intensity limit that the blower filter device can be operated safely in a potentially explosive environment. In particular, the formation of an arc or sparks can be prevented.

The detection of the deactivating event depends on at least one signal of the sensor array. The analysis comprises a comparison of a signal or of a time curve with a predefined threshold value.

In one embodiment, the sensor array comprises a voltage sensor. This voltage sensor is capable of measuring a variable, which is correlated with the current electrical output voltage or with the current charging voltage of the internal energy storage unit. This measured voltage is therefore also correlated with the state of charge of the internal energy storage unit. The deactivating event will have occurred according to this embodiment when this measured voltage is above a predefined voltage limit. The state of charge limit is preferably between 80% and 95% of the fully charged state, especially preferably at about 85%. If the state of charge is above this state of charge limit, the current from the current supply unit to the internal energy storage unit over the energy interface cannot be above the current intensity limit any longer.

In another embodiment, the sensor array comprises a connection sensor and a time period sensor. The connection sensor is capable of detecting the event that the voltage supply unit is electrically connected to the energy interface. For example, the connection sensor generates a signal when it has detected that a connection is established and/or when it has detected that no connection is established. The connection sensor may be, for example, a mechanical sensor, an optical sensor, a voltage sensor or another electrical sensor. The time period sensor is capable of measuring the time period that has elapsed since the establishment of an electrical connection between the energy interface and the voltage supply unit. It is sufficient in many applications if this time period is below 1 sec, and especially preferably between 0.1 sec and 0.5 sec.

These two embodiments may be combined with one another. The control device is capable of analyzing and/or combining signals from the sensors of the sensor array in different manners in order to detect the deactivating event. For example, the control device deactivates the current limitation device when the state of charge has exceeded the state of charge limit and the time period has elapsed as well. This configuration leads to a redundancy and to increased operational reliability. It is also possible that the control device deactivates the current limitation device when the chronologically earlier event occurs, i.e., it deactivates it when the state of charge has exceeded the state of charge limit, but at the latest after the end of the time period. This configuration saves time.

It is possible that the blower filter device is optionally operated in a first mode, in which both events must have occurred, and in a second mode, in which the chronologically earlier event must have occurred.

Various embodiments are possible for the configuration of the current limitation device. In one embodiment, the current limitation device comprises a current limitation unit and a switchable electrical connection unit. The switchable electrical connection unit is arranged in parallel to the current limitation unit and can be brought optionally into a conduction state or into a blocked state. In the conduction state, the connection unit connects the energy interface to the internal energy storage unit and it preferably has a lower electrical resistance value than does the current limitation unit. The connection unit therefore bypasses the current limitation unit in the conduction state. In the blocked state, the connection unit interrupts this connection, since it has a higher resistance value than does the current limitation unit, preferably a practically infinitely high resistance value.

The control unit is capable of actuating the connection unit. The connection unit is in the blocked state at least when the energy interface is disconnected from the voltage supply unit. After the control device has detected the deactivating event, the control device switches the connection element from the blocked state into the conduction state. As a result, the current limitation device is bypassed and thereby deactivated. The step of deactivating the current limitation device consequently comprises in this embodiment the step of bypassing the current limitation unit by the connection unit being switched into the conduction state.

This embodiment eliminates the need to configure the current limitation unit itself as an actuatable component. The current limitation unit may rather remain in the same state all the time and is deactivated by being bypassed. The connection unit may also have a simple configuration, e.g., as a switch with at least two possible states.

In one embodiment, the electronic connection unit comprises at least one switch and/or one bidirectional thyristor diode and/or a bidirectional diode and/or a transistor and/or a relay and/or a mechanical contact and/or a spark gap.

In one embodiment, the current limitation device comprises at least one ohmic resistance and/or an inductance and/or a transistor partially biased into conduction. These electronic components are suitable alone as well as in combination with one another to limit the intensity of an electrical current. In addition, these electronic components are available at low cost and have, as a rule, only a low weight and require only a small space.

In a preferred embodiment, the current limitation device comprises an actuatable electronic component. This electronic component has a variable electrical resistance. The resistance of this component is higher in the activated state than in the deactivated state. After the control device has detected the deactivating event, the control device reduces the electrical resistance of this component and changes thereby the current limitation device from the activated state into the deactivated state.

In one embodiment, the electrical resistance value can be reduced abruptly, e.g., by switching over, which can often be carried out with especially simple means and in a cost-effective manner. In another embodiment, the resistance value can be reduced gradually or continuously or stepwise. This has the advantage that the current intensity of the current flow to the internal energy storage device can be controlled or regulated especially precisely. It is possible that the electrical resistance value is reduced as a function of the increasing state of charge of the internal energy storage unit or of the elapsed time stepwise or gradually. It is achieved hereby that the internal energy storage device is charged rapidly, without an excessively high current intensity being brought about. It is possible to regulate the current intensity as a function of the state of charge, and a maximum allowable current intensity is the command variable, the adjustable resistance value is the controlled variable or a controlled variable and the state of charge is a disturbance variable.

In a variant of the configuration with the actuatable electronic component, the electronic component comprises a transistor. The control device is capable of actuating this transistor such that the transistor can optionally be biased partially into conduction or it can be fully biased into conduction. The electrical resistance value of the transistor biased partially into conduction is higher than the electrical resistance value of the transistor biased fully into conduction. After the detection of the deactivating event, the control device brings the transistor into the state in which it is fully biased into conduction. This configuration eliminates the need for providing an additional component, which is used after the detection of the deactivating event. The current limitation device can rather be embodied by means of a single actuatable component.

According to the present invention, the current limitation device is activated at least when the energy interface is electrically disconnected from the voltage supply unit. In one embodiment, the control device automatically activates the current limitation device as a response to the process that the control device has detected the event that the energy interface is disconnected from the voltage supply unit.

In one embodiment, the blower filter device comprises an additional energy interface, which can be connected electrically to an additional voltage supply unit and is arranged parallel to the (first) energy interface. The two energy interfaces may be configured for the connection with voltage supply units of the same type or with different voltage supply units. The blower filter device can therefore be connected optionally simultaneously to two voltage supply units of the same type or to two different voltage supply units or to only one voltage supply unit. The blower filter device preferably comprises an additional current limitation device, which is associated with the additional energy interface and which is activated at least when the additional energy interface is disconnected from the additional voltage supply unit. The control device is capable of deactivating the additional current limitation device independently from the current limitation device, namely, when an additional deactivating event is detected. This additional deactivating event has occurred when the state of charge has exceeded the state of charge limit and/or when the predefined time limit or an additional predefined time limit has elapsed since the establishment of an electrical connection between the additional energy interface and the additional voltage supply unit.

It is also possible that the same current limitation device is connected to both energy interfaces. It is possible, furthermore, that the control device connects the current limitation device optionally to the first energy interface or to the additional energy interface or to both energy interfaces, depending on which energy interface is connected to a voltage supply unit in a dependent manner and which is not.

As a rule, the blower unit can be switched on and switched off and can therefore be brought optionally into a switched-on state or into a switched-off state. A user can preferably actuate an operating element and thereby switch the blower unit on and off again. If the blower unit is switched off, it is possible at any time that it will be switched on again.

In one embodiment, the blower filter device automatically activates the current limitation device in response to the fact that the blower unit is switched on and/or is switched off. This embodiment limits the current intensity, which can occur during the switching on and switching off of the blower unit, especially when the energy interface is electrically connected to the voltage supply unit when the blower unit is switched on. This embodiment preferably ensures that the current limitation device is or will be automatically activated with the blower unit switched off.

In one variant of this embodiment, the control device automatically activates the current limitation device in response to the fact that the blower unit is switched on or is switched off again. In another embodiment, the actuating element for the blower unit is connected to an electrical connection between the energy interface and the current limitation device. As long as the blower unit is switched off, the energy interface is electrically disconnected from the current limitation device and from the internal energy storage unit. As soon as the blower unit is switched on by means of the actuating element, the energy interface is connected electrically to the current limitation device. The internal energy storage unit is preferably charged thereby. This embodiment ensures that the current intensity is limited when the blower unit is switched on, without the control device having to be involved.

The voltage supply unit may be a stationary unit. In a preferred embodiment, the blower filter device comprises, by contrast, a storage unit. A mobile voltage supply unit can be inserted, for example, pushed into this storage unit, and it can again be removed from the storage unit. The mobile voltage supply unit is electrically connected to the energy interface after the insertion. An autonomously operatable blower filter system is provided. This configuration makes it possible to transport the blower filter system, i.e., the blower filter device together with the mobile voltage supply unit, to a desired location of use and to use it there. Thanks to the storage unit, the mobile voltage supply unit can be replaced rapidly. It is necessary in many cases to open a housing of the blower filter device in order to have access to the voltage supply unit.

The mobile voltage supply unit is preferably rechargeable and is configured, for example, as a battery pack. The blower filter device preferably shields a mobile voltage supply unit in the storage unit against the environment and protects the inserted voltage supply unit from external effects, especially from high or low temperatures, fire, water, dirt, harmful chemicals, mechanical stress. It is also possible that the storage unit holds the mobile voltage supply unit on an outer side of a housing of the blower filter device. A quick closure device preferably holds the mobile voltage supply unit in or at the storage unit and prevents the voltage supply unit from being accidentally disconnected from the energy interface.

In a preferred embodiment, the energy interface is arranged in or at the storage unit. If the voltage supply unit is fully inserted into the storage unit, the voltage supply unit is electrically coupled to the energy interface. The energy interface can be cleaned from the outside with the voltage supply unit removed.

The blower filter device may comprise additional components, for example, a breathing air tube, in order to pass through breathing air, a face mask, a hood and/or a mouthpiece. The filter mount may preferably accommodate a plurality of filter units one after another, and also different units. The filter mount may be configured to this end to accommodate different filter units simultaneously or one after another.

The blower unit, which is capable of drawing in ambient air and passing on filtered air, preferably comprises a motor and a fan impeller. The motor is capable of setting the fan impeller into rotation. The blower unit preferably comprises, in addition, a spiral housing, which encloses the fan impeller and passes through the air stream, and/or a converter for the motor.

The blower filter device comprises according to the present invention an internal energy storage unit. In one embodiment, this internal energy storage unit comprises at least one capacitor. A capacitor has the advantage that a capacitor can be charged relatively rapidly and is capable of reliably storing and releasing a sufficient amount of electrical energy, the electrical energy released guaranteeing stable operation of the blower unit. It is also possible that the internal energy storage unit comprises at least one battery built into the device.

The blower filter device comprises according to the present invention a control device, which deactivates the current limitation device after the detection of the deactivating event. This control device is preferably arranged within a housing, and the other components of the blower filter device are preferably likewise protected by this housing, and the energy interface is arranged at this housing.

All the features and/or advantages appearing from the claims, from the description or from the drawings, including design details and arrangements in space, may be essential for the present invention both in themselves and in the different combinations.

The present invention will be described below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF PREFERRED EMBODIMENTS

Figure 1:
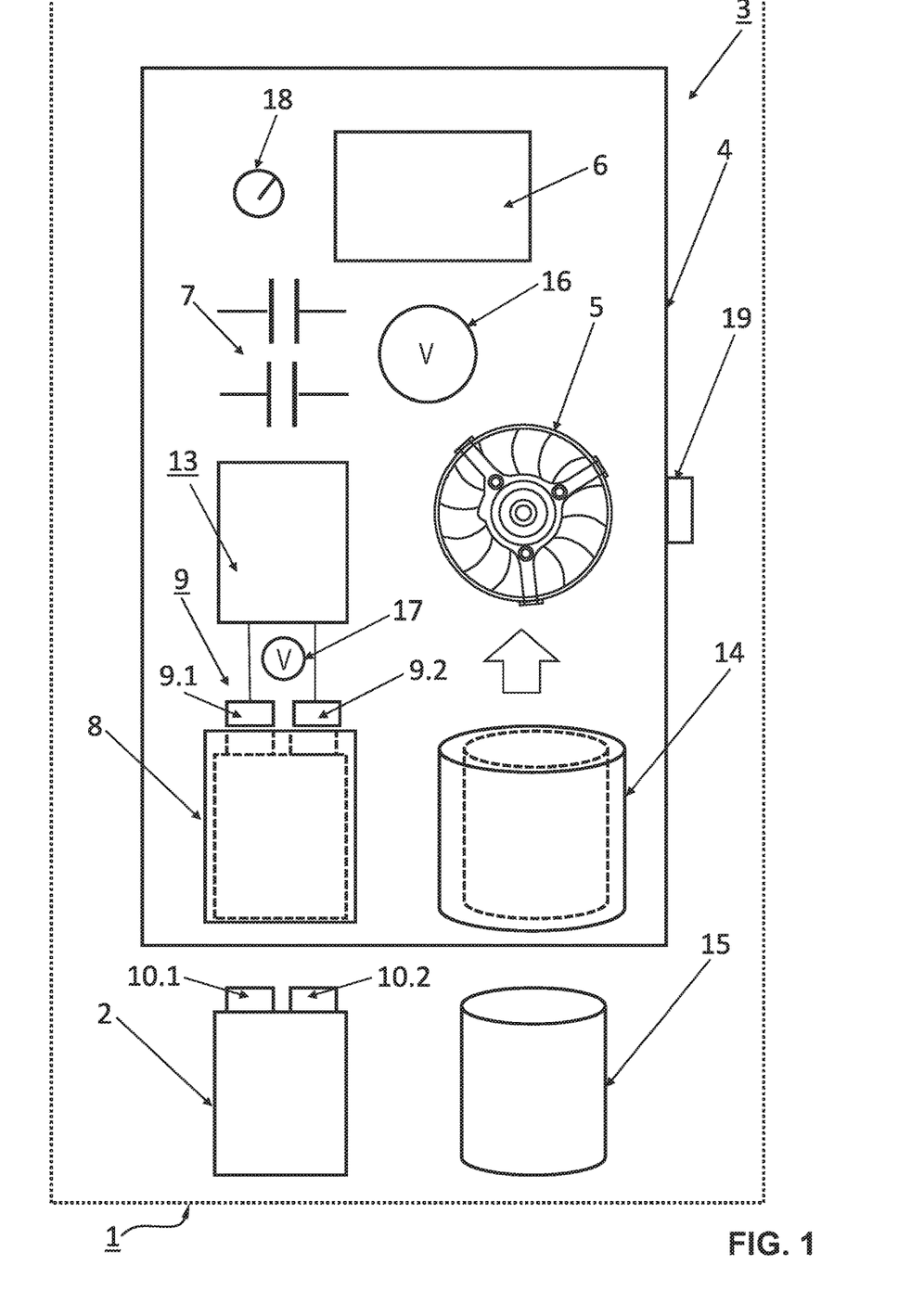
FIG. 1 is a schematic view showing the configuration of an embodiment of a blower filter device according to the present invention.

Referring to the drawings, FIG. 1 shows by way of an example how a blower filter device 3 according to the present invention may be configured. The following components are arranged in a housing 4:
- a blower unit 5, which comprises a fan impeller, an electric motor and a DC/AC converter, not shown, for the electric motor,
- an actuating element 19, with which a user can switch the blower unit 5 on and off,
- a filter mount 14, which is capable of accommodating a filter cartridge 15;
- an internal energy storage unit 7, which comprises two capacitors in the exemplary embodiment,
- a storage unit 8, which is capable of accommodating a mobile voltage supply unit in the form of a battery pack 2,
- an energy interface 9 with two electrical contact points 9.1, 9.2,
- a voltage sensor 16, which is capable of measuring the current charging voltage of the internal energy storage unit 7,
- a connection sensor 17, which is capable of determining whether a battery pack 2 is inserted into the storage unit 8 or not and which is likewise configured in the exemplary embodiment as a voltage sensor,
- a time period sensor in the form of a system clock 18, which is capable of measuring the time period that has elapsed since an event, e.g., since the insertion of a battery pack 2 into the storage unit 8,
- a current limitation device (circuit) 13, which will be described below, and
- a control device 6, which receives signals from the voltage sensor 16, from the connection sensor 17 and from a sensor, not shown, for determining whether the blower unit 5 is switched on or is switched off, and is capable of actuating the current limitation device 13.

The blower unit 5 is capable of drawing in air from the environment by means of the fan impeller and of generating an air stream thereby. This air stream flows through the inserted filter cartridge 15 and is purified in the process. The purified air stream is available for a user, not shown, of the blower filter device 3. The air stream is preferably sent through a breathing air tube to a face mask. The user can switch on the blower unit 5 and switch it off again, doing so by means of the actuating element 19.

The battery pack 2 comprises two electrical contact points (terminals) 10.1 and 10.2. The battery pack 2 is shown in FIG. 1 once outside the storage unit 8 with solid lines and once with broken lines in a position in which the battery pack 2 is inserted into the storage unit 8. In this inserted position, the contact points 10.1 and 10.2 of the battery pack 2 contact the corresponding contact points 9.1 and 9.2 of the energy interface 9. The filter cartridge 15 is shown once with solid lines in a position outside the filter mount 14 and once with broken lines in a position in which the filter cartridge 15 is inserted into the filter mount 14.

The blower unit 5 is preferably not supplied directly from the battery pack 2. The battery pack 2 rather charges the internal energy storage unit 7 via the energy interface 9, and the internal energy storage unit 7 supplies the blower unit 5.

A blower filter system 1 can be worn by a user, e.g., on a belt or as a backpack, and it comprises
the blower filter device 3,
the battery pack 2 in the storage unit 8 and
the filter cartridge 15 in the filter mount 14.

The current limitation device 13 is permanently connected electrically to the internal energy storage unit 7. The current limitation device 13 can be actuated by the control device 6 and be brought optionally into an activated state and into a deactivated state. The current limitation device 13 limits in the activated state the current intensity from the energy interface 9 to the internal energy storage unit 7 to a predefined current intensity limit. When the current limitation device 13 is deactivated, the current intensity may be above this current intensity limit.

The internal energy storage unit 7 is connected electrically permanently to the blower unit 5. If the battery pack 2 is inserted into the storage unit 8 and the contact points 10.1 and 10.2 contact the corresponding contact points 9.1 and 9.2, the battery pack 2 is connected electrically to the internal energy storage unit 7 via the circuit 13. The battery pack electrically charges the internal energy storage unit 7.

The internal energy storage unit 7 is capable of supplying the blower unit 5 with electricity for a certain time period even if the battery pack 2 has been depleted or is not inserted into the storage unit 8. It is possible hereby to replace the battery pack 2 with the blower unit 5 operating, even during the ongoing operation. It is not necessary to leave a hazardous environment for the replacement.

In the exemplary embodiment, the connection sensor 17 is capable of measuring the voltage between the two contact points 9.1 and 9.2. The control device 6 is capable of analyzing the signals and of automatically distinguishing between the following three situations:
No battery pack 2 has been inserted into the storage unit 8.
The battery pack 2 inserted into the storage unit 8 is discharged and must be replaced.
The battery pack 2 inserted into the storage unit 8 supplies sufficient voltage.

Figure 2:
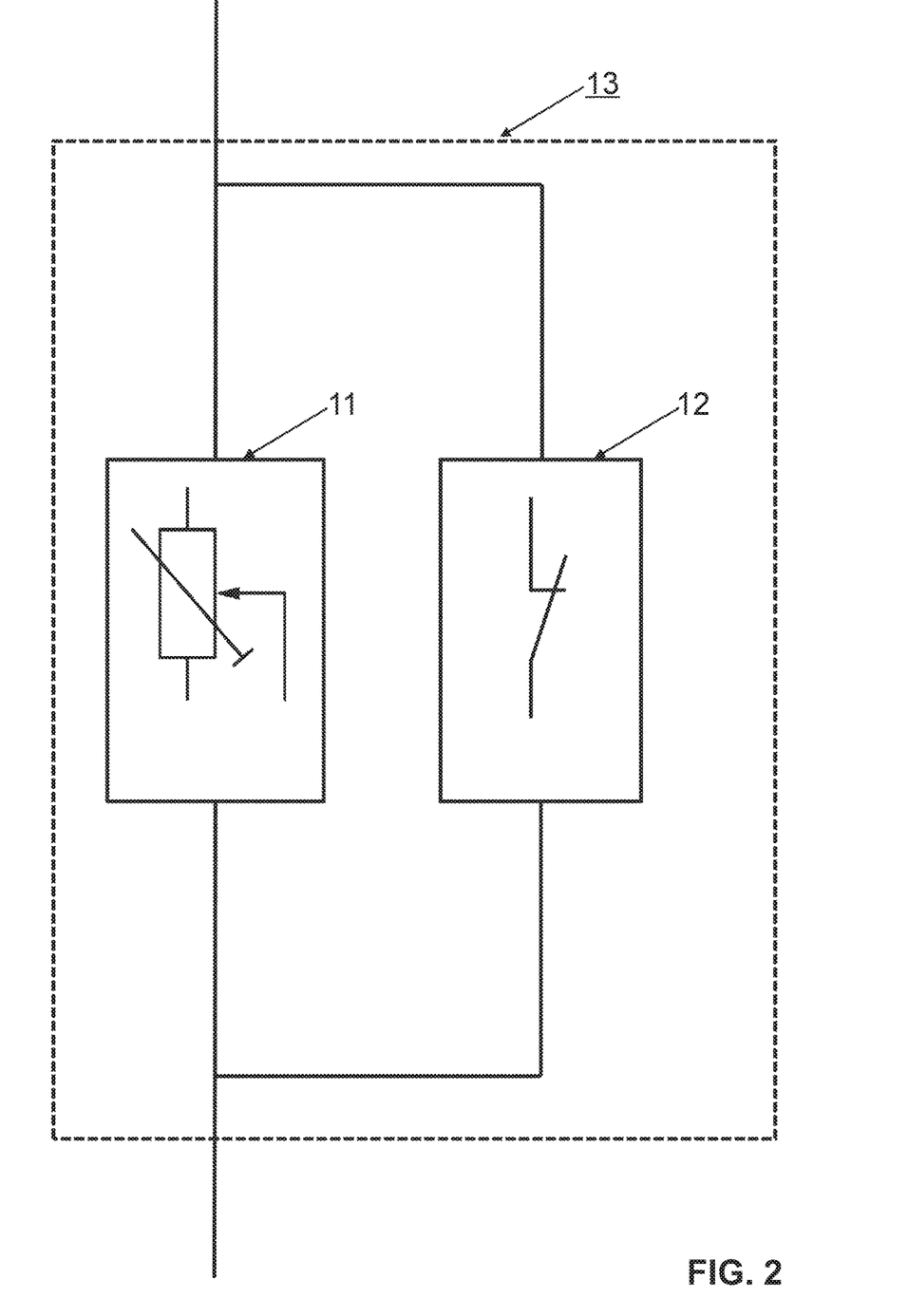
FIG. 2 is a circuit view showing an exemplary embodiment of a circuitry for current limitation.

FIG. 2 shows as an example the current limitation device 13. This circuit 13 comprises a current limitation unit 11 and a switchable electrical connection unit 12, which is arranged in parallel to the current limitation unit 11. The connection unit 12 can be actuated and be brought optionally into a conduction state or into a blocked state. The current limitation unit 11 comprises in the exemplary embodiment an actuatable potentiometer, i.e., it has a variable electrical resistance value. The lowest possible electrical resistance value of the current imitation unit 11 is higher than the electrical resistance value of the switchable electrical connection unit 12 in the conduction state. In the blocked state, the electrical resistance value of the connection unit 12 is several times higher than the resistance value or than the maximum resistance value of the current limitation unit 11, for example, it is practically infinite. The control device 6 is capable of actuating both the current limitation unit 11 and the connection unit 12. If the connection unit 12 is in the blocked state, the current intensity, which flows through the current limitation device 3, is limited to a predefined current intensity limit. It is also possible that the current limitation unit 11 has a fixed resistance value and cannot be actuated.

It is also possible that the current limitation unit 11 is not bypassed by a switchable electrical connection unit 12. The current limitation device 13 is preferably deactivated in this embodiment by its electrical resistance value being reduced.

Figure 3:
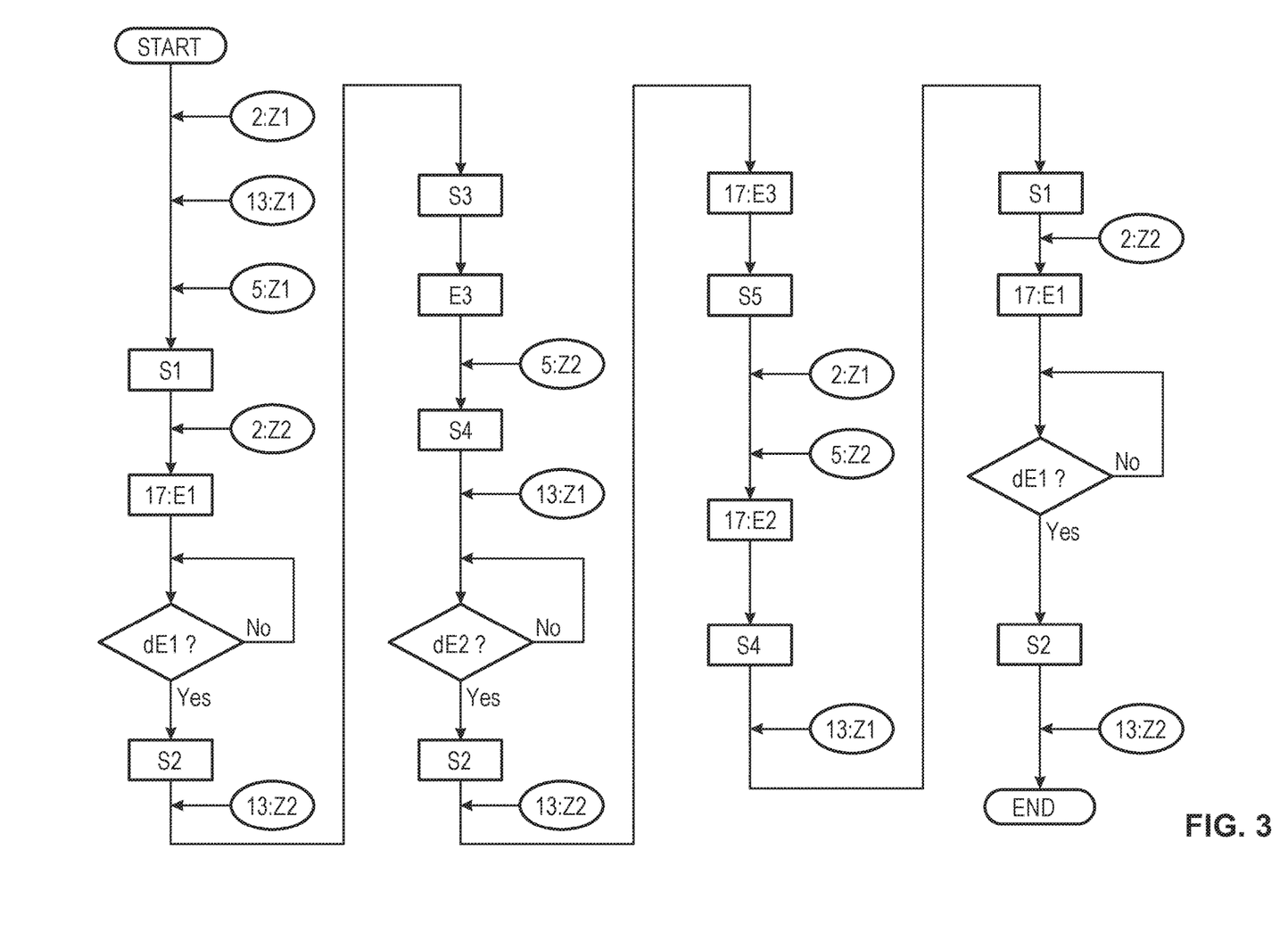
FIG. 3 is a flow chart showing steps of an exemplary process, which is carried out during the operation of the blower filter device.

FIG. 3 shows as an example a flow chart of how the blower filter device 3 is operated. The blower filter device 3 is in the following state prior to the use:
The energy interface 9 is not connected to a battery pack 2 (state 2:Z1).
The current limitation device 13 is in the activated state (state 13:Z1).
The blower unit 5 is switched off (state 5:Z1).
The following steps are then carried out:
The user inserts the battery pack 2 into the storage unit 8 (step S1). An electrically connection is established thereby between the battery pack 2 and the energy interface 9. The battery pack 2 is connected thereby electrically to the internal energy storage unit and charges same.
The connection sensor 17 sends a signal indicating that the battery pack 2 is electrically connected to the energy interface 9 (event 17:E1).
The control device 6 checks whether the first deactivating event has occurred (checking dE1?).
As soon as this has happened (branch Yes), the control device 6 deactivates the current limitation device 13 (step S2). The current limitation device 13 is in the deactivated state (13:Z2) now.
The user actuates the actuating element 19 for the blower unit 5 and switches the blower unit 5 on thereby (step S3). The blower unit 5 is in the switched-on state now (state 5:Z2).
A sensor, not shown, detects the actuation of the actuating element 19 or it detects in another manner that the blower unit 5 is switched on now (event E3).
As a response to the switching on of the blower unit 5, the control device 6 activates the current limitation device 13 (step S4). The current limitation device 13 is again in the activated state now (state 13:Z1).
The control device 6 checks whether the second deactivating event has occurred (checking dE2?). The second deactivating event may be set in exactly the same manner as the first deactivating event or it may be different from it.
As soon as the second deactivating event is detected (branch Yes), the control device 6 deactivates the current limitation device 13 again (step S2). The current limitation device 13 is in the deactivated state now (state 13:Z2). Current can flow from the battery pack 2 via the energy interface 9 to the internal energy storage unit 7 and farther to the switched-on blower unit 5 without the current limitation device 13 limiting the current intensity.
The connection sensor 17 detects after some time that the battery pack 2 has been depleted and must be replaced (step 17:E3).
The user removes the battery pack 2 from the storage unit 8. The electrical connection is interrupted thereby between the battery pack 2 and the energy interface 9 (step S5). The blower unit 5 remains switched on.
The connection sensor 17 detects that no battery back 2 is present any more in the storage unit 8 (step 17:E2).
The control device 6 activates in response to this the current limitation device 13 (step S4).
The current limitation device 13 is in the activated state again (state 13:Z1).
The user inserts a new battery back 2 (step S1).

The connection sensor 17 sends a signal that the battery pack 2 is electrically connected to the energy interface 9 (event 17:E1). The state 2:Z2 is detected.

The control device 6 checks whether the first deactivating event has occurred (checking dE1?).

As soon as this has happened (branch Yes), the control device 6 deactivates the current limitation device 13 (step S2). The current limitation device 13 is in the deactivated state now (state 13:Z2).

Figure 4:
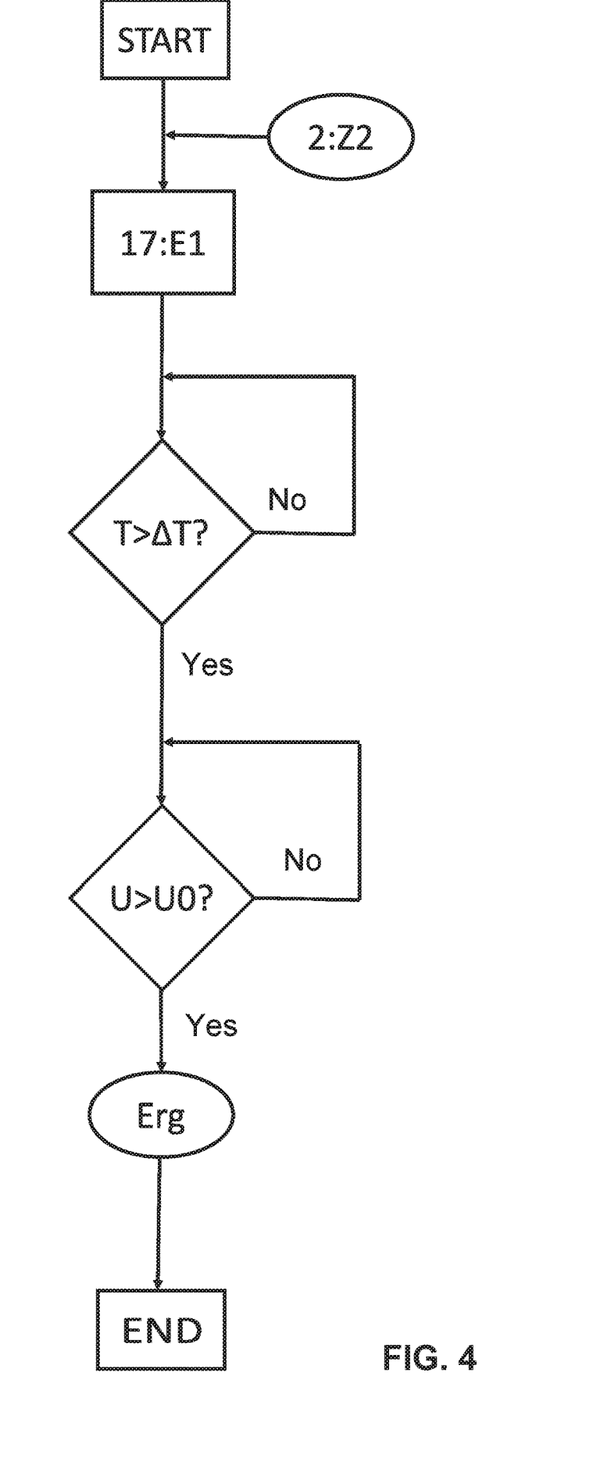
FIG. 4 is a flow chart showing a first possible embodiment of when the deactivating event is detected.

FIG. 4 shows a possible embodiment of how the first deactivating event is detected (checking dE1? in FIG. 3).

The connection sensor 17 detects that a battery pack 2 is inserted into the storage unit 8 (event 17:E1).

The time period sensor 18 checks whether the predefined time period $\Delta T$ has elapsed since the insertion of the battery pack 2 into the storage unit 8. This time period $\Delta T$ is preferably shorter than 1 sec, especially preferably shorter than half a second.

As soon as this has happened, the voltage sensor 16 checks whether the charging voltage U of the internal energy storage unit 7 is above a predefined charging voltage limit U0.

As soon as this has happened, the result Erg shows that the deactivating event has occurred.

Both events must have consequently occurred, namely, the predefined time period $\Delta T$ must have elapsed since the connection and the charging voltage U must be above the predefined charging voltage limit U0 in this embodiment. The checking may, of course, also be carried out in the reverse order or simultaneously.

Figure 5:
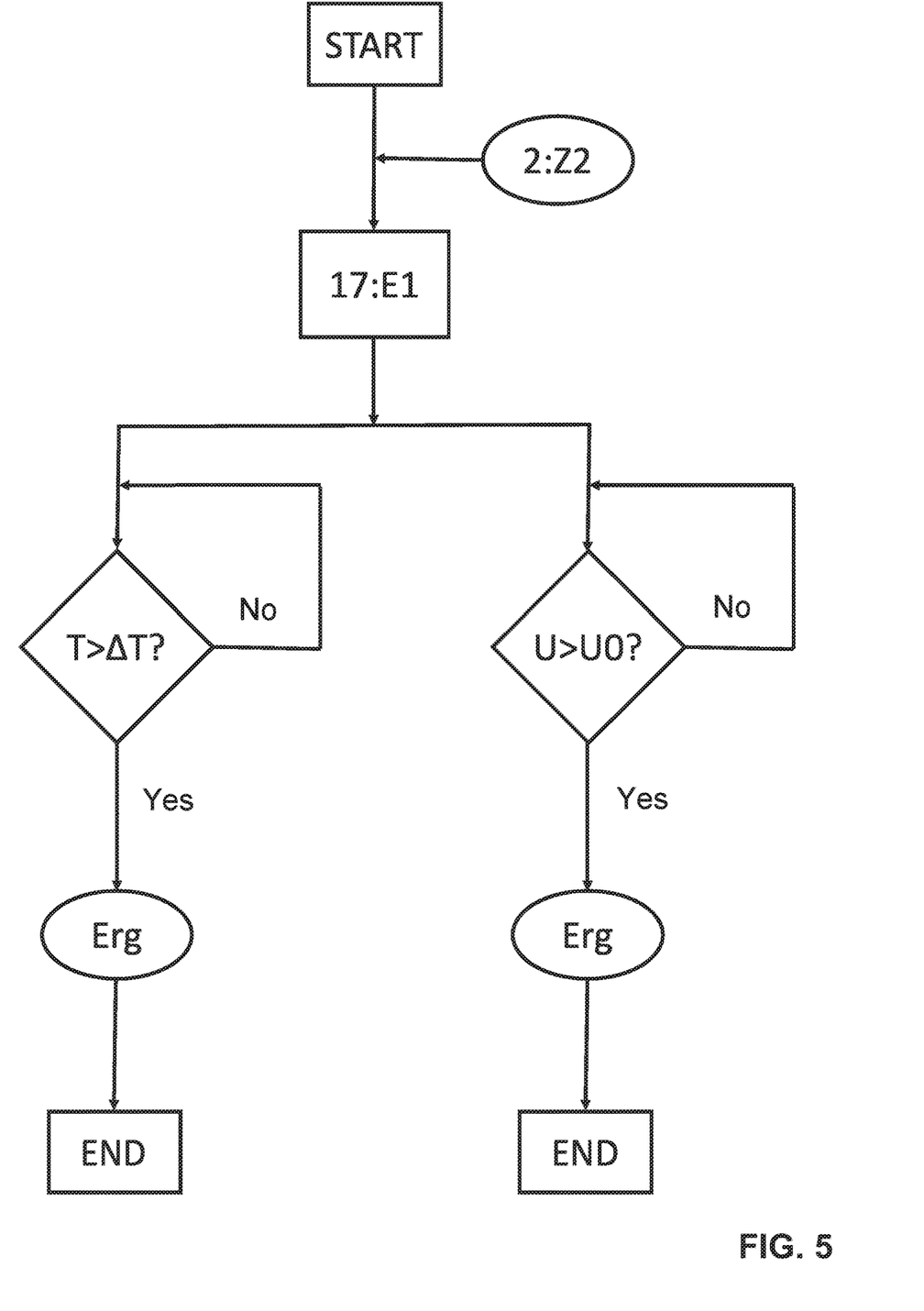
FIG. 5 is a flow chart showing a possible alternative embodiment of when the deactivating event is detected.

FIG. 5 shows an alternative embodiment of how the first deactivating event is detected. The two checks are carried out simultaneously in this alternative embodiment. The deactivating event has occurred as soon as the time limit $\Delta T$ has elapsed or the charging voltage U is above the charging voltage limit U0. Consequently, if the charging voltage U is above the charging voltage limit U0 already before the end of the time period $\Delta T$, the control device 6 deactivates the current limitation device 13 already before the end of this time period.

It is possible that the user switches the blower unit 5 off (state 5:Z1), for example, during a pause. This triggers the following procedure:

The sensor, not shown, detects the actuation of the actuating element 19 and that the blower unit 5 has now been switched off.

In response to this, the control device 6 activates the current limitation device 13, so that this is in the activated state (state 13:Z1).

The current limitation device 13 remains in the activated state.

As soon as the sensor detects that the actuating element 19 was again actuated and the blower unit 5 is switched on, the control device 6 checks whether the second deactivating event has occurred (checking dE2?).

As soon as this has happened, the control device 6 deactivates the current limitation device 13 again. Current can flow now without limitation to the blower unit 5.

In the embodiment just described, the control device 6 activates the current limitation device 13 in response to the fact that a user has actuated the actuating element 19 for the blower unit 5. In an embodiment different from this, the control device 6 is not used to activate the current limitation device 13 after the blower unit 5 has been switched on, but to deactivate it again after the detection of the deactivating event. The actuating element 19 is connected mechanically to a switch, for example, to a pin, in this different embodiment. This switch optionally connects the current limitation device 13 to the energy interface 9 or disconnects these from one another. As long as the blower unit 5 is switched off, the current limitation device 13 and hence also the internal energy storage unit 7 are disconnected electrically from the energy interface 9. As soon as the user switches the blower unit 5 on by means of the actuating element 19, the switch establishes the electrical connection between the energy interface 9 and the current limitation device 13. The internal energy storage unit 7 is charged, and the current limitation device 13 limits the current intensity.

Just like in the preceding embodiment, the control device 6 preferably activates the current limitation device 13 as soon as the second deactivating event is detected. As soon as the user switches the blower unit 5 off again by means of the actuating element 19, the control device 6 activates the current limitation device 13, for example, by the control device 6 interrupting the electrical bypass. In addition, the current limitation device 13 is disconnected electrically from the energy interface 9 because the switch for the corresponding electrical connection is moved. It is sufficient that the actuating element 19 is connected to this one switch for the electrical connection between the energy interface 9 and the current limitation device 13.

While specific embodiments of the invention have been shown and described in detail to illustrate the application of the principles of the invention, it will be understood that the invention may be embodied otherwise without departing from such principles.

LIST OF REFERENCE CHARACTERS

1 Blower filter system, comprises the blower filter device 3, the battery pack 2 in the storage unit 8 and the filter cartridge 15 in the filter mount 14

2 Mobile voltage supply unit in the form of a battery pack, can be pushed into the storage unit 8

3 Blower filter device

4 Housing of the blower filter device 3

5 Blower unit, comprises a fan impeller, a motor and a converter

6 Control device; receives measured values from the sensor array 16, 17, 18, detects the first and second deactivating events and deactivates the current limitation device 11

7 Internal energy storage unit, comprises two capacitors in the exemplary embodiment

8 Storage unit for accommodating the battery pack 2

9 Energy interface, connected electrically permanently to the internal energy storage unit 7, comprises the contact points 9.1, 9.2

9.1, 9.2 Contact points of the energy interface 9

10.1, 10.2 Contact points (terminals) of the battery pack 2

11 Current limitation device

12 Switchable electrical connection unit

13 Current limitation device, comprises the current limitation device 11 and the connection unit 12

14 Filter mount, accommodates the filter cartridge 15

15 Filter cartridge, accommodated in the filter mount 14

16 Voltage sensor for the charging voltage of the internal energy storage unit 7

17 Connection sensor, sends a signal, which indicates whether a battery pack 2 is connected electrically to the energy interface 9 or not 18 System clock in the control device 6; measures the time period that has elapsed since the insertion of a battery pack 2 into the storage unit 8
19 Actuating element for the blower unit 5
2:Z1 State: Battery pack 2 disconnected from the energy interface 9
2:Z2 State: Battery pack 2 connected to the energy interface 9
5:Z1 State: Blower unit 5 switched off
5:Z2 State: Blower unit 5 switched on
13:Z1 State: Current limitation device 13 in the activated state 13:Z2 State: Current limitation device 13 in the deactivated state
17:E1 Event: Connection sensor 17 sends signal: Battery pack 2 electrically connected to the energy interface 9
17: E2 Event: Connection sensor 17 sends signal: Battery pack 2 electrically disconnected from the energy interface 9
17:E3 Step: Connection sensor 17 generates the signal that the battery pack 2 does not supply sufficient current any more (voltage too low)
dE1? Checking: Has the first deactivating event occurred?
dE2? Checking: Has the second deactivating event occurred?
E3 Event: Actuation of the actuating element 19 has been determined
Erg Result: Deactivating event detected
S1 Step: Insert battery pack 2 into storage unit 8, establish electrical connection to the energy interface 9
S2 Step: Deactivate current limitation device 13
S3 Step: Switch actuating element 19 for the blower unit 5 on
S4 Step: Activate current limitation device 13
S5 Step: Remove battery pack 2 from storage unit 8, interrupt electrical connection to the energy interface 9
T>ΔT? Checking: Has the predefined time period ΔT elapsed since the connection?
U>U0? Checking: Is the charging voltage U of the internal energy storage unit 7 above the predefined charging voltage limit U0?

The invention claimed is:

1. A blower filter device comprising:
   a blower unit for generating an air stream;
   a filter mount for accommodating a filter unit;
   an internal energy storage unit;
   an energy interface, wherein the internal energy storage unit is connected electrically to both the blower unit and the energy interface and is chargeable with electrical energy and is configured to release the electrical energy, and wherein the energy interface is configured to be electrically connectable to a voltage supply unit and to be electrically disconnectable from the voltage supply unit;
   an activatable and deactivatable current limitation device;
   a sensor array; and
   a control device,
   wherein the blower filter device is configured such that the current limitation device is activated when the energy interface is disconnected from the voltage supply unit,
   wherein the activated current limitation device is configured to maintain an intensity of a current from the energy interface to the internal energy storage unit below a predefined current intensity limit,
   wherein the sensor array is configured to detect a predefined deactivating event, wherein the deactivating event has occurred:
   if a state of charge of the internal energy storage unit has exceeded a predefined state of charge limit and/or
   if a predefined time period has elapsed since the establishment of an electrical connection between the energy interface and the voltage supply unit, and
   wherein the control device is configured to deactivate the current limitation device after the detection of the deactivating event such that the internal energy storage unit is connected electrically to the energy interface after the deactivation without limitation to the predefined current intensity limit.

2. A blower filter device in accordance with claim 1, wherein the sensor array comprises a voltage sensor configured to measure a variable, which is correlated with an electrical output voltage or a charging voltage of the internal energy storage unit.

3. A blower filter device in accordance with claim 1, wherein the sensor array comprises:
   a connection sensor; and
   a time period sensor,
   wherein the connection sensor is configured to detect that the voltage supply unit is connected electrically to the energy interface, and
   wherein the time period sensor is configured:
   to measure a time that has elapsed since establishing the electrical connection between the energy interface and the voltage supply unit, and
   to compare the elapsed time with a predefined threshold value.

4. A blower filter device in accordance with claim 1, wherein the current limitation device comprises:
   a current limitation unit; and
   a switchable electrical connection unit,
   wherein the connection unit is arranged in parallel to the current limitation unit, and
   wherein the switchable electrical connection unit connects the energy interface electrically to the internal energy storage unit in a conduction state and interrupts this connection in a blocked state, and
   wherein the control device is configured to switch the electrical connection unit from the blocked state into the conduction state after the detection of the deactivating event.

5. A blower filter device in accordance with claim 4, wherein the switchable electrical connection unit has a bidirectional thyristor diode and/or a bidirectional diode and/or a transistor and/or a relay and/or a mechanical contact and/or a spark gap.

6. A blower filter device in accordance with claim 1,
   wherein the current limitation device has at least one electronic component with a variable electrical resistance value, and
   wherein the control device is configured to reduce the electrical resistance value of this component after the detection of the deactivating event.

7. A blower filter device in accordance with claim 6, wherein the electronic component comprises at least one transistor and/or a potentiometer.

8. A blower filter device in accordance with claim 7, wherein the control device is configured to reduce the electrical resistance value as a function of the state of charge of the internal energy storage unit.

9. A blower filter device in accordance with claim 7,
   wherein the electronic component comprises at least one transistor, which can partially or fully be biased into conduction, and wherein the electrical resistance value of the transistor biased partially into the conduction is higher than that of the transistor biased fully into the conduction.

10. A blower filter device in accordance with claim 1, wherein the control device is configured to automatically activate the current limitation device in response to the disconnection of the energy interface from the voltage supply unit.

11. A blower filter device in accordance with claim 1, wherein the blower unit can be switched on and can be switched off, and the blower filter device is configured to automatically activate the current limitation device in response to the switching on and/or switching off of the blower unit.

12. A blower filter device in accordance with claim 11, wherein the blower filter device comprises an actuating element for switching on and switching off the blower unit, and
wherein the actuating element is connected to an electrical connection between the current limitation device and the energy interface such that an actuation of the actuating element for switching on the blower unit connects the current limitation device electrically to the energy interface and an actuation of the actuating element for switching off the blower unit disconnects the current limitation device electrically from the energy interface.

13. A blower filter device in accordance with claim 1, wherein the blower filter device comprises a storage unit for accommodating the voltage supply unit, and
wherein the storage unit is configured such that the voltage supply unit accommodated by the storage unit is connected electrically detachably to the energy interface.

14. A blower filter system comprising:
a voltage supply unit; and
a blower filter device comprising:
a blower unit for generating an air stream;
a filter mount for accommodating a filter unit;
an internal energy storage unit;
an energy interface, wherein the internal energy storage unit is connected electrically to both the blower unit and the energy interface and is chargeable with electrical energy and is configured to release the electrical energy, and wherein the energy interface is configured to be electrically connectable to the voltage supply unit and to be electrically disconnectable from the voltage supply unit;
an activatable and deactivatable current limitation device;
a sensor array; and
a control device,
wherein the blower filter device is configured such that the current limitation device is activated when the energy interface is disconnected from the voltage supply unit,
wherein the activated current limitation device is configured to maintain an intensity of a current from the energy interface to the internal energy storage unit below a predefined current intensity limit,
wherein the sensor array is configured to detect a predefined deactivating event, wherein the deactivating event has occurred:
if a state of charge of the internal energy storage unit has exceeded a predefined state of charge limit; and/or
if a predefined time period has elapsed since the establishment of an electrical connection between the energy interface and the voltage supply unit; and
wherein the control device is configured to deactivate the current limitation device after the detection of the deactivating event such that the internal energy storage unit is connected electrically to the energy interface after the deactivation without limitation to the predefined current intensity limit.

15. A breathing air supply system comprising:
a blower filter device comprising:
a blower unit for generating an air stream;
a filter mount for accommodating a filter unit;
an internal energy storage unit;
an energy interface, wherein the internal energy storage unit is connected electrically to both the blower unit and the energy interface and is chargeable with electrical energy and is configured to release the electrical energy, and wherein the energy interface is configured to be electrically connectable to a voltage supply unit and to be electrically disconnectable from the voltage supply unit;
an activatable and deactivatable current limitation device;
a sensor array; and
a control device,
wherein the blower filter device is configured such that the current limitation device is activated when the energy interface is disconnected from the voltage supply unit,
wherein the activated current limitation device is configured to maintain an intensity of a current from the energy interface to the internal energy storage unit below a predefined current intensity limit,
wherein the sensor array is configured to detect a predefined deactivating event, wherein the deactivating event has occurred:
if a state of charge of the internal energy storage unit has exceeded a predefined state of charge limit; and/or
if a predefined time period has elapsed since the establishment of an electrical connection between the energy interface and the voltage supply unit; and
wherein the control device is configured to deactivate the current limitation device after the detection of the deactivating event such that the internal energy storage unit is connected electrically to the energy interface after the deactivation without limitation to the predefined current intensity limit;
a face mask; and
a connection unit configured to establish a fluid connection between the blower filter device and the face mask.

16. A process for operating a blower filter device, wherein the blower filter device comprises a blower unit for generating an air stream, a filter mount for accommodating a filter unit, an internal energy storage unit and an energy interface, wherein the internal energy storage unit is connected electrically to the energy interface, the process comprising the steps of:
electrically connecting the energy interface to a voltage supply unit at least once;
providing the blower filter device so that the blower filter device further comprises a current limitation device, a control device and a sensor array, activating the current limitation device before the step of electrically connecting; wherein the following steps are carried out after the connection:

maintaining, with the activated current limitation device, an intensity of a current from the energy interface to the internal energy storage unit below a predefined current intensity limit;

detecting, with the sensor array, a predefined deactivating event, wherein the deactivating event will have occurred when the state of charge of the internal energy storage unit has exceeded a predefined state of charge limit and/or when a predefined time period has elapsed since the establishment of an electrical connection between the energy interface and the voltage supply unit; and deactivating, with the control device, the current limitation device after the detection of the deactivating event such that the intensity of the current from the energy interface to the internal energy storage unit is not limited to the predefined current intensity limit after the detection of the deactivating event.

17. A process in accordance with claim 16, wherein the blower filter device comprises a storage unit for accommodating the voltage supply unit, and the step of connecting the energy interface electrically to the voltage supply unit is carried out with the voltage supply unit and it comprises the step of inserting the voltage supply unit into the storage unit such that the voltage supply unit is electrically connected to the energy interface after the insertion.

18. A process in accordance with claim 16, wherein at least one of the steps of connecting the energy interface to the voltage supply unit or disconnecting the energy interface from the voltage supply unit is detected automatically and the at least one of the steps triggers the step of the control device automatically activating the current limitation device.

19. A process in accordance with claim 16, wherein the blower unit can be switched on and switched off repeatedly, wherein the current limitation device is activated with the blower unit switched off, wherein the step of switching off the blower unit triggers the step in which the control device activates the current limitation device, and wherein the step of switching on the blower unit triggers the step in which the control device deactivates the current limitation device after the detection of the deactivating event.

* * * * *